United States Patent
Miller et al.

(10) Patent No.: US 8,768,315 B2
(45) Date of Patent: Jul. 1, 2014

(54) METHOD AND APPARATUS FOR IDENTIFYING A SUSPECT THROUGH MULTIPLE CORRELATED DEVICE IDENTITIES

(75) Inventors: Trent J. Miller, West Chicago, IL (US); Tyrone D. Bekiares, Park Ridge, IL (US); Timothy J. Collins, Homer Glen, IL (US); Deborah J. Monks, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 72 days.

(21) Appl. No.: 13/603,589

(22) Filed: Sep. 5, 2012

(65) Prior Publication Data
US 2014/0066028 A1  Mar. 6, 2014

(51) Int. Cl.
*H04M 3/42* (2006.01)
*H04W 64/00* (2009.01)
*H04W 68/00* (2009.01)

(52) U.S. Cl.
CPC .............. *H04W 64/00* (2013.01); *H04W 68/00* (2013.01)
USPC .................. 455/414.1; 455/456.1; 455/456.5; 455/456.6; 340/573.1; 340/572.4; 340/870.01

(58) Field of Classification Search
CPC ....... H04W 64/00; H04W 24/00; H04M 3/42; G08B 23/00
USPC .............. 454/414.1; 455/456.1, 456.5, 456.6; 340/573.1, 572.4, 870.01
See application file for complete search history.

(56) References Cited

U.S. PATENT DOCUMENTS

| | | | |
|---|---|---|---|
| 7,246,746 B2 | 7/2007 | McNamara et al. | |
| 7,400,892 B1 | 7/2008 | Banks et al. | |
| 7,433,694 B2 | 10/2008 | Morgan et al. | |
| 7,692,579 B2 | 4/2010 | Vassilovski | |
| 7,834,765 B2 | 11/2010 | Sawyer | |
| 8,027,549 B2 | 9/2011 | Podilchuk | |
| 8,036,426 B2 | 10/2011 | Hampapur et al. | |
| 8,049,658 B1 | 11/2011 | Lagonik et al. | |
| 8,217,785 B2 | 7/2012 | Steer | |
| 8,260,323 B1 * | 9/2012 | Bronner et al. ............ | 455/456.6 |

(Continued)

FOREIGN PATENT DOCUMENTS

| | | |
|---|---|---|
| CA | 2500082 A1 | 9/2006 |
| EP | 1895462 A1 | 3/2008 |
| EP | 2189957 A1 | 5/2010 |
| WO | WO 2010145172 A1 * | 12/2010 |

OTHER PUBLICATIONS

Ericsson Labs "Mobile Location API" Maps and Positioning Version 1.5; Updated May 5, 2011; 5 pages.

(Continued)

*Primary Examiner* — David Q Nguyen
(74) *Attorney, Agent, or Firm* — Kenneth A. Haas (57) ABSTRACT

A method and apparatus for identifying a suspect through location and time events is provided herein. During operation a central server continuously receives updates from multiple networks regarding device identifiers and associated access points. When an event (e.g., a crime) occurs at a certain location, an access point(s) near the event are identified and devices associated with the access point(s) at the time of the event are determined. The identified devices are then utilized to determine potential suspects.

17 Claims, 4 Drawing Sheets

(56) References Cited

U.S. PATENT DOCUMENTS

| | | | |
|---|---|---|---|
| 2007/0008981 | A1 | 1/2007 | Pathan |
| 2007/0239813 | A1 | 10/2007 | Pinder et al. |
| 2007/0287428 | A1 | 12/2007 | Diacakis et al. |
| 2008/0036612 | A1* | 2/2008 | Koslow et al. ............. 340/573.4 |
| 2008/0081638 | A1 | 4/2008 | Boland et al. |
| 2008/0164997 | A1 | 7/2008 | Aritsuka et al. |
| 2008/0231460 | A1 | 9/2008 | Owen et al. |
| 2008/0287143 | A1 | 11/2008 | Banks et al. |
| 2008/0318591 | A1 | 12/2008 | Oliver |
| 2010/0227628 | A1 | 9/2010 | Anderson et al. |
| 2011/0035420 | A1 | 2/2011 | Alizadeh-Shabdiz et al. |
| 2011/0143776 | A1* | 6/2011 | Shankaranarayanan et al. .......................... 455/456.3 |
| 2011/0151839 | A1 | 6/2011 | Bolon et al. |
| 2012/0105232 | A1 | 5/2012 | Humbard |
| 2012/0195295 | A1* | 8/2012 | Elmaleh ........................ 370/338 |
| 2012/0244885 | A1* | 9/2012 | Hefetz ....................... 455/456.2 |
| 2013/0023247 | A1* | 1/2013 | Bolon et al. ............... 455/414.1 |
| 2013/0031601 | A1 | 1/2013 | Bott |
| 2013/0150074 | A1* | 6/2013 | Shrestha et al. ........... 455/456.1 |
| 2014/0066089 | A1 | 3/2014 | Monks et al. |

OTHER PUBLICATIONS

Gentian et al, 1"A new mobile police spatial information service grid computing model based on mobile agent", Geoinformatics, 2010 18th International Conference on, IEEE, Piscataway, NJ, USA, Jun. 18, 2010, pp. 1-5, XP031750257,A ISBN: 978-1-4244-7301-4.

International Search Report and Written Opinion mailed Nov. 21, 2013 in International Patent Application No. PCT/US2013/055742.

International Search Report and Written Opinion mailed Feb. 26, 2014 in International Patent Application No. PCT/US2013/055750.

Jaishankar K., et al. "Crime Analysis Mapping in India: A GIS Implementation in Chennai City", ALGO Research Quarterly, Dec. 1, 2001; p. 4-25; XP002996111, Abstract.

Non Final Office Action mailed Nov. 6, 2013 in U.S. Appl. No. 13/603,920, Deborah J. Monks, filed Sep. 5, 2012.

Notice of Allowance mailed Jan. 6, 2014 in U.S. Appl. No. 13/603,920, Deborah J. Monks, filed Sep. 5, 2012.

Quick, D, "Researchers track mobile phone locations with cheap hardware and open-source software", Feb. 16, 2012, 8 pages, Retrieved from the Internet: URL:http://www.gizmag.com/mobile-phone-location-tracking/21500/.

* cited by examiner

METHOD AND APPARATUS FOR IDENTIFYING A SUSPECT THROUGH MULTIPLE CORRELATED DEVICE IDENTITIES

FIELD OF THE INVENTION

The present invention generally relates to identifying a suspect at a crime scene, and more particularly to a method and apparatus for identifying a suspect through multiple correlated location and time events.

BACKGROUND OF THE INVENTION

Tools and processes to identify crime suspects have always been valuable in solving and preventing crime. Whether it's the use of finger prints, voice-recognition, or DNA analysis, any tool available for solving and preventing crime could be extremely useful to law enforcement. These tools become even more valuable when they are able to quickly identify a suspect. Therefore, a need exists for techniques for quickly identifying a suspect at a crime scene,

BRIEF DESCRIPTION OF SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus are provided for identifying a suspect through device identifications determined for various location and time events. During operation a central server continuously receives updates from multiple networks regarding device identifiers and associated access points. When an event (e.g., a crime) occurs at a certain location, an access point(s) near the event is identified and devices associated with the access point(s) at the time of the event are determined. The identified devices are then utilized to determine potential suspects.

In practice, the number of devices in a vicinity of a crime (suspect devices) may be extremely large. In order to reduce the number of devices considered as "suspect devices", multiple occurrences of a single device at multiple crime scenes or events are utilized to identify suspect devices. In particular, the process of identifying suspect devices is repeated for multiple events (e.g., crimes). Suspect devices common to the multiple events are then identified as a subset of suspect devices common to both events.

The above technique assumes that a person's identity may be determined from a device identity. Such device identities include, but are not limited to a media access 802.11x (MAC) address, a cellular device identifier such as, but not limited to a International Mobile Subscriber Identity (IMSI) or Temporary Mobile Subscriber Identity (TMSI), International Mobile Equipment Identifier (IMEI), Radio Identifier, Group Identifier, application IDs, such as telephone number, email address, social media ID and the like. From the device identity, an appropriate service provider may be contacted to obtain owner information.

As an example, assume that a bank robbery occurred at $5^{th}$ and State Streets on Jun. 25, 2012 at 10:05 AM. A central server may be accessed and provided the date, time, and location of the event. The central server will determine all access points near (e.g., within 1 mile) the crime scene. All devices associated with the identified access points during the time period of the crime will be identified through their device identity. For example, all devices associated with the access points between, for example, 10:00 and 10:10 on Jun. 25, 2012 will be identified. These devices will be categorized as "suspect devices".

As is evident, the number of suspect devices may be extremely large. For example, if the above-described bank robbery occurred within a large city, there may be thousands of devices associated with dozens of access points near the time and location of the event. In order to reduce the number of suspect devices, the above process could be repeated for another similar crime. For example, assume that a bank robbery having a similar motif happened on May 15, 2012 at 1:15 PM. The above process could be utilized to identify all suspect devices near that crime scene at the time of the crime. A reduced number of suspects can be determined by identifying those devices that were near both crime scenes. Once a manageable number of suspect devices are identified, network operators may be contacted to determine the owners of the suspect devices.

As another example, assume a known kidnap victim had an electronic device (e.g., a cell phone) that periodically associated with an access point. For example, assume that the victim periodically turns on their cell phone to make calls for help. The associated access point could be determined and suspect devices near the access point could be identified as described above.

For example, assume that the victim turned on their device, which associated to an access point at a first location. The central server could then be used to identify all electronic devices associated to access points near the first location at the time the victim's device was powered on. If the victim again turned on their device an hour later at a second location (or the victim was transported to a new location with their smartphone powered on), the above process could be repeated and electronic devices associated to access points near the second location would be identified. Those devices that were common to an access point near the first location and an access point near the second location could then be identified as a subset of suspect devices. The above process could be repeated indefinitely.

It should be noted that the "time" surrounding an event in which device IDs are determined, may not be a short time. This time period may comprise days, weeks, months, or years. For example, assume that a bomb was planted at a national monument. A central server may be accessed to determine that an individual had visited the monument an inordinate amount of times prior to the bomb being discovered. In this situation, the "time period" may simply be a day of the week prior to, or after the crime.

Prior to describing a more-detailed description of the present invention, the following definitions are provided to aide in understanding the description provided below.

Access Point—Infrastructure communication equipment that allows wireless devices to connect to a network. Such equipment includes, but is not limited to, equipment commonly referred to as repeaters, base radios, base stations (BS), evolved Node Bs (eNB), wireless routers, base transceiver stations, WiFi access points, or any other type of infrastructure equipment interfacing with one or more wireless electronic devices.

Electronic Device—Any electronic device capable of associating with an access point in order to obtain network access. Such electronic devices include, but are not limited to laptop computers, cellular telephones, smart phones, electronic tablets, modems, MiFi, private PTT devices, and the like.

Suspect Device—An electronic device that was identified as being associated with an access point near an event within a predetermined time of the event occurring.

Subset of Suspected Devices—Those suspect devices that have been identified as being associated with an access point near a first event within a predetermined time of the event occurring, and additionally associated with at least a second event within a predetermined time of the second event occurring.

Network—Wireless communications infrastructure, including transport. LTE, HRPD, eHRPD, UMTS, CDMA infrastructure.

Device ID—An alpha-numeric number such as a MAC address, IMSI, TMSI, email address, telephone number, social media identifier, that is provided to a network access point in order to identify the device to the network or to identify the device to an application.

Figure 1:
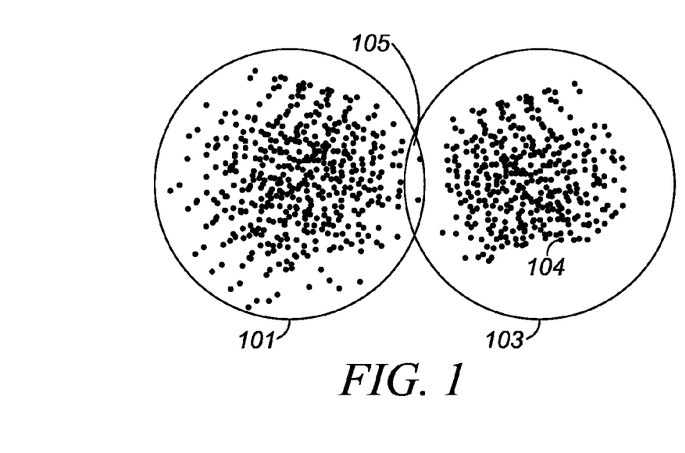
FIG. 1 illustrates correlated device identities.

FIG. 1 illustrates the identification of suspect devices as described above. Assume that data set 101 comprise suspect devices 104 near a first crime scene, and that dataset 103 comprises suspect devices 104 near a second crime scene. As discussed above, these devices were determined because they were associated with an access point near the crime scene, close to the time of the crime. (Only one device 104 is labeled in FIG. 1). For example, assume that set 101 contains devices identified near a first bank robbery and assume that set 103 contains devices identified near a second bank robbery. The intersection 105 of sets 101 and 103 contains a subset of suspect devices 104 that were registered to access points near both crime scenes close to the time of the crimes. As is evident, the intersection 105 contains many fewer devices 104 than each set alone.

As described above, when identities of the suspected electronic devices are determined, network operators can be contacted and provided with the identified MAC, IMSI, TMSI, . . . , etc. User identification can then be obtained from the network operators.

Figure 2:
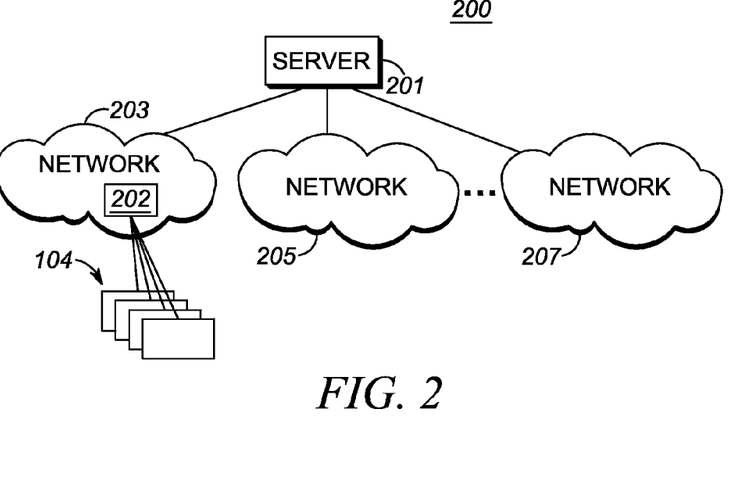
FIG. 2 is block diagram illustrating a general operational environment, according to one embodiment of the present invention.

FIG. 2 is block diagram illustrating system 200 for identifying suspect devices as described above. As shown in FIG. 2 a plurality of networks 203-207 are in communication with central server 201. Networks 203-207 may each comprise one of any number of over-the-air or wired networks, and may be distinctly different networks in terms of technology employed and network operators used. For example a first network may comprise a private 802.11 network set up by a building operator, while a second network may be a next-generation cellular communications network operated by a cellular service provider. Thus, network 203 may comprise a next-generation cellular communication system employing a 3GPP Long Term Evolution technology (LTE) system protocol, while network 205 may comprise an 802.11 communication system protocol.

Although only a single access point 202 is shown in system 200, each network 203-207 comprises at least one access point 202 utilized to give network access to multiple electronic devices. Each network 203-207 is in communication with server 201 and continuously (or periodically) provides server 201 with information on times and dates that various electronic devices 104 have registered with various access points 202 within their network. This information may be provided directly to server 201 from access points 202, or may be passed by access points 202 to centralized network infrastructure equipment (not shown), which may relay this information to server 201.

Thus, during operation various electronic devices 104 are continuously associating with and un-associating with multiple access points 202 within networks 203-205. When a particular device 104 associates with a particular access point 202, the access-point 202 provides server 201 with the device ID, its own ID, the date and time of association. When the particular device 104 disassociates with the access-point 202 (or is no longer available for reasons of power loss, RF loss, etc.), the access point 202 provides server with the device ID, its own ID, and the data and time of disassociation. Optionally, a location of access point 202 may be provided along with the above information. Alternatively, the location may not be provided if server 201 has a database of access point locations. Server 201 then stores this information within an internal database and utilizes the information in identifying potential suspect devices.

Figure 3:
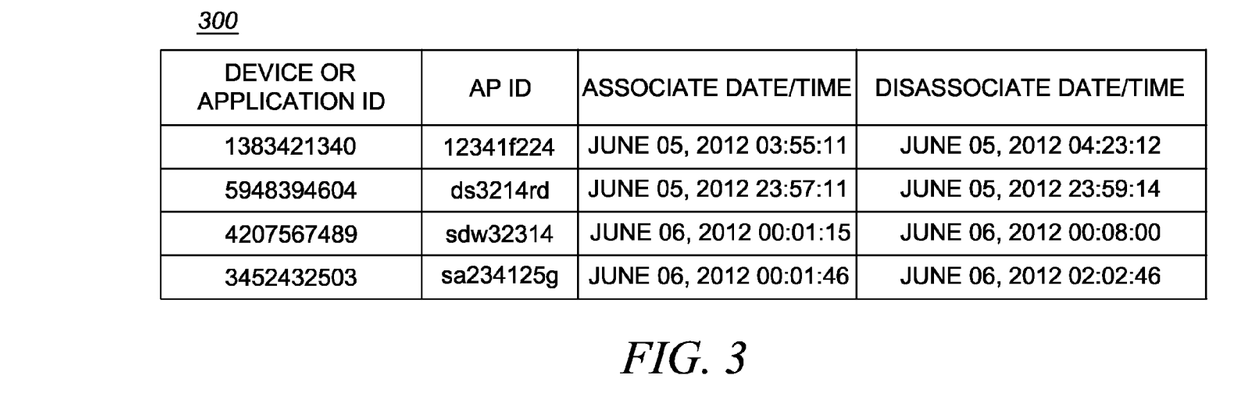
FIG. 3 illustrates data provided from a network to a server.

FIG. 3 illustrates data provided from a network to a server. As discussed above, the data may be provided directly from network access points 202 to server 201, or through some intermediary (such as network controllers, mobile switching centers, . . . , etc.). As shown, server 201 maintains a table (database) of device IDs, access point IDs, Dates/Times of device association with the access point, and Dates/Times of device disassociation with the access point.

Figure 4:
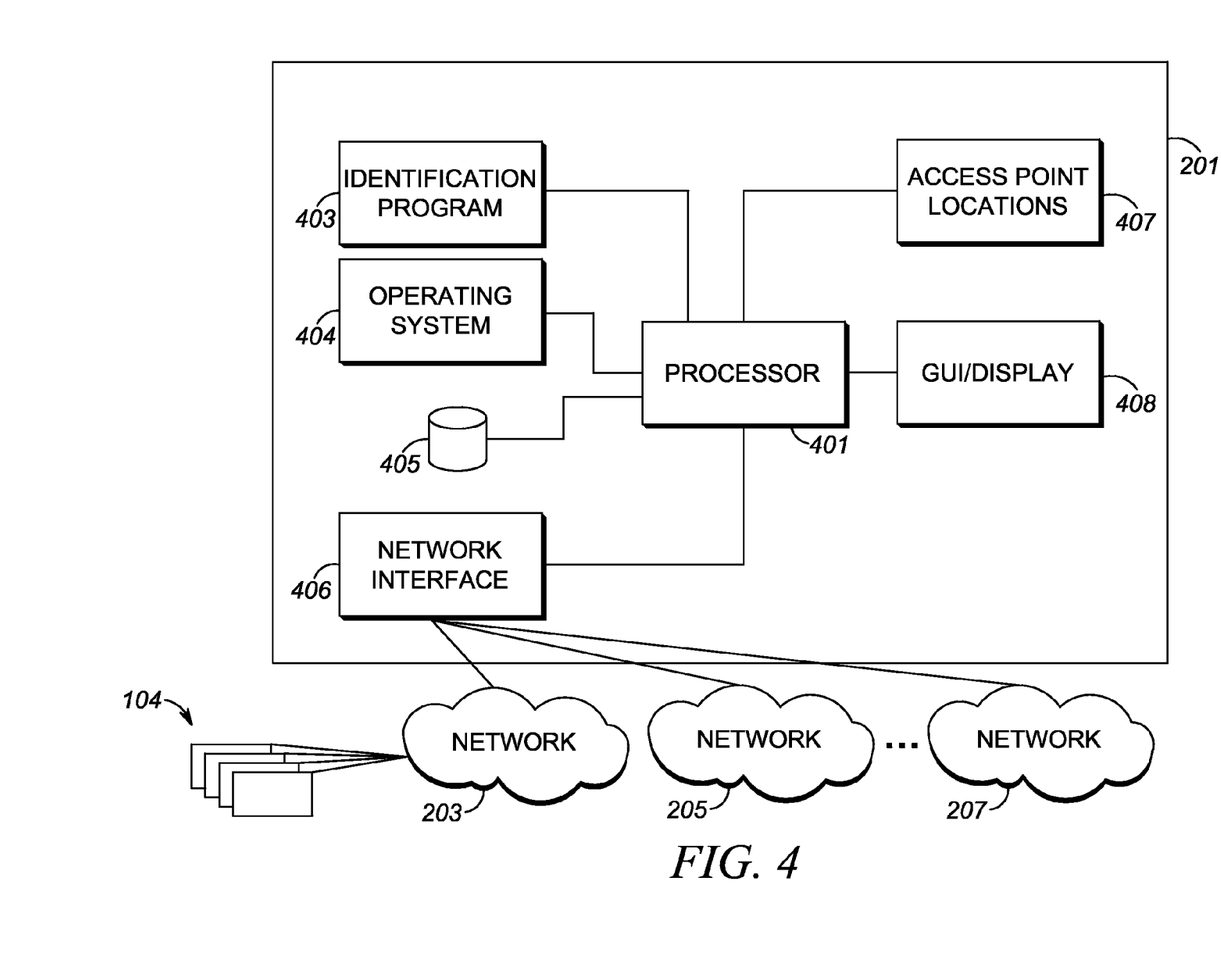
FIG. 4 is a block diagram of a server shown in FIG. 2.

FIG. 4 is a block diagram of a server 201 shown in FIG. 2. In general, as used herein, the central server 201 being "configured" or "adapted" means that server 201 is implemented using one or more components (such as memory components, network interfaces, and central processing units) that are operatively coupled, and which, when programmed, form the means for these system elements to implement their desired functionality, for example, as illustrated by reference to the methods shown in FIG. 5. Central server 201 comprises a processor 401 that is communicatively coupled with various system components, including networks 203-207, a network interface 406, a storage component 405 storing database 300 shown in FIG. 3, an optional storage component 407 storing an access-point locations 407, and graphical-user interface 408.

In the current implementation, central server 201 is configured to compute suspect devices when given a time and location of an event. Server 201 is also used to produce a subset of suspect devices when given multiple times and locations of multiple events.

Central server 201 further comprises an operating system 404 and a device identification program 403. Only a limited number of system elements are shown for ease of illustration; but additional elements may be included in the central server 201.

Figure 5:
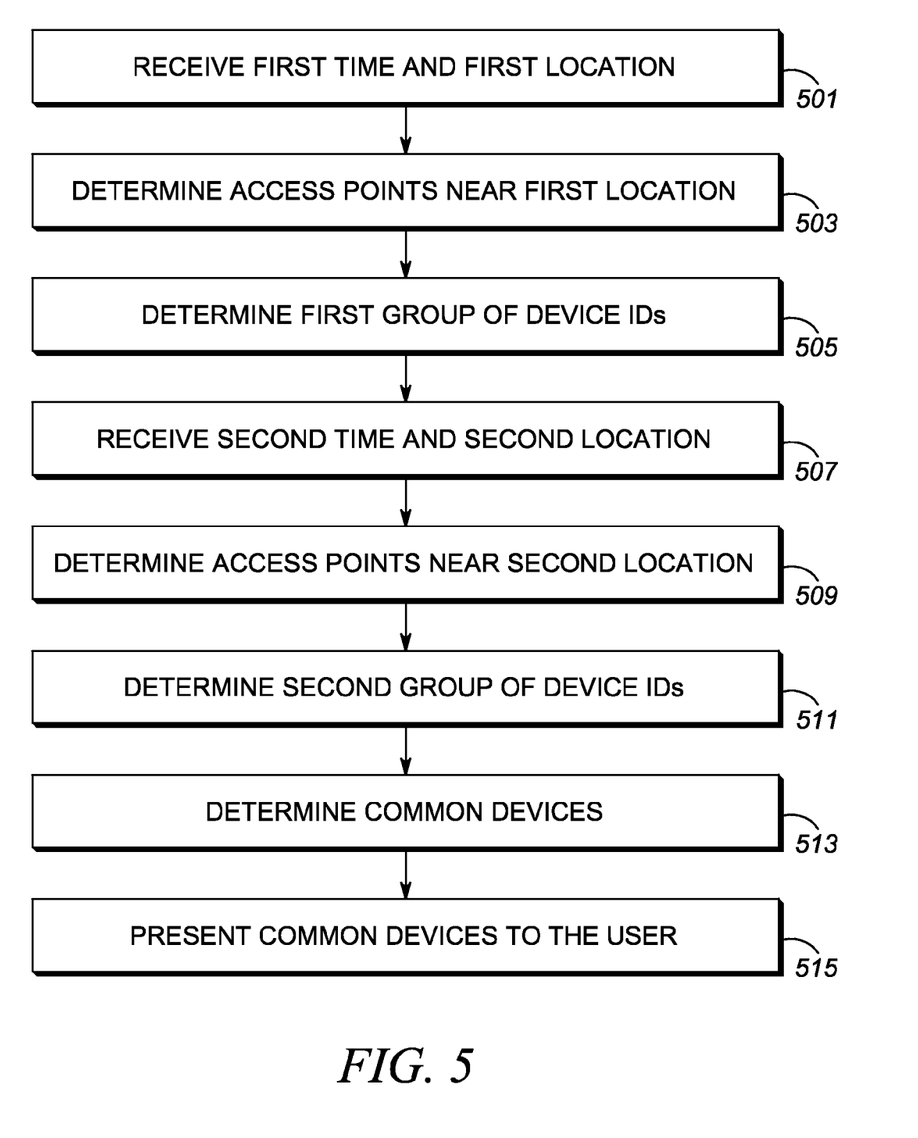
FIG. 5 is a flow chart showing the operation of the server of FIG. 4.

Processor 401 may be partially implemented in hardware and, thereby, programmed with software or firmware logic or code (e.g., the device identification program 403) for performing functionality described in FIG. 5; and/or the processor 401 may be completely implemented in hardware, for example, as a state machine or ASIC (application specific integrated circuit). All storage and components 403-405 and 407 can include short-term and/or long-term storage of various information needed for the functioning of the respective elements.

In the illustrative embodiment, networks 203-207 are attached (i.e., connected) to the central server 201 through network interface 406 and communicates with the processor 401. Central server 201 may receive, and store data from networks as shown in FIG. 3.

Where networks 203-207 are connected wirelessly to the network interface 406, network interface 406 includes elements including processing, modulating, and transceiver elements that are operable in accordance with any one or more standard or proprietary wireless interfaces, wherein some of the functionality of the processing, modulating, and transceiver elements may be performed by means of the processor 401. Examples of network interfaces (wired or wireless) include Ethernet, T1, USB interfaces, IEEE 802.11b, IEEE 802.11g, cellular network interfaces, etc.

As discussed networks 203-207 capture association data every time an electronic device associates with the network's access points 202. Additionally, networks 203-207 capture disassociation data every time an electronic device disassociates with the network's access points 202.

Device identification program 403 runs on top of the operating system 404 (e.g., Windows 7 or Linux). When the device identification program 403 is requested by the operating system 404 to be launched, it is executed therein by the processor 401. The processor 401 uses the device identification program 403 to receive a date, time, and location and return suspect devices. As described above, the date, time, and location may comprise the date, time and location of an event such as a crime. Alternatively, processor 401 uses the device identification program to receive multiple dates, times, and locations of events and return a subset of suspect devices common to all events.

During operation of server 201, the information on dates, times, and locations is input into processor 401 via GUI 408, which may simply comprise a keyboard and monitor. In a similar manner suspect devices and/or a subset of suspected devices are provided to a user of server 201 via GUI 408 as a list of device IDs.

Thus, during operation, network interface 406 continuously receives access data from networks 203-207. As described above, the data preferably comprises a device ID, an application point ID, a date and time of association of the device with the application point, a date and time of disassociation of the device with the application point, and an optional location of the application point. The location of the application point may comprise an address or any geographic coordinate for the application point (e.g., latitude/longitude).

Additionally, to save network bandwidth, an internal database 407 may be maintained of access point IDs and their associated location.

Processor 401 receives the network data and stores the network data as table 300 in database 405. Processor 401 will then receive (via GUI 408) a date, time, and location. Processor 401 may also receive other parameters such as, but not limited to distance parameters used for including or excluding access points. For example, processor 401 may receive a request to determine all device IDs associated with access points within 500 feet of $5^{th}$ and Mane, on Tuesday, Aug. 28, 2012.

Processor 401 will utilize the location of the event to determine all nearby access points within a predetermined distance (e.g., 500 feet) of the location. Once the nearby access points are determined, processor 401 will determine suspect devices that associated with the nearby access points within a predetermined time period surrounding the time of the event. For example, processor 401 will determine device IDs for all electronic devices that associated with the nearby access points ½ hour before, to ½ hour after the event. These suspect devices will be presented through GUI 408 as a list of IDs, and may be saved as a data file in database 405.

As discussed above, the list of suspect devices may be quite large. Processor 401 (when executing identification program 403) will be configured to narrow down the list of suspect devices by receiving a second date, time, and location of a second event. Suspect devices may be determined as described above for the second event, and those suspect devices common to the first event date/time/location and the second event date/time/location may be presented to the user of server 201 as a subset of suspect devices. For clarification, "devices common to an event" is envisioned to encompass those devices associated with access points near the event, at a time period close to the time of the event.

In an alternate embodiment, processor 401 may receive a date, time, and location, and then determine those devices that associated with access points more than a predetermined number of times over a time period. For example, processor 401 may receive a time (e.g., Aug. 28, 2012 at 12:00 PM) as an input time. Processor 401 may also receive a distance value (e.g., 1 mile) and a location (Washington Monument). In this particular embodiment, processor 401 may receive a time period (e.g., 1 week) and a threshold number of associations (e.g., 15). Processor 401 will then determine all device IDs that associated more than 15 times with access points within 1 mile of the Washington Monument for the week prior to Aug. 28, 2012 at 12:00 PM.

FIG. 5 is a flow chart showing the operation of the server of FIG. 4 in accordance with a first embodiment of the present invention. The logic flow of FIG. 5 assumes that database 405 is being continuously populated with access data as shown in FIG. 3. The logic flow begins at step 501 where processor 401 receives a first time and first location. At step 503 processor 401 accesses database 405 to determine at least a first access point near the first location. A first group of fixed or mobile devices IDs are then determined that were associated with the first access point at the first time (step 505). At this point the device IDs may be output to a user through a graphical user interface, however, in order to narrow the number of devices the following optional steps may take place.

At step 507 processor 401 receives a second time and second location. At step 509 processor 401 accesses database 405 to determine at least a second access point near the second location. A second group of fixed or mobile devices IDs are then determined that were associated with the second access point at the second time (step 511). At step 513 those suspect devices that are common to the first group of devices and the second group of devices are determined and presented to a user through GUI 408 as a subset of suspect devices (step 515). Thus, at step 515 potential suspect(s) are determined by determining a subset of devices common to the first group of devices and the second group of devices This process can be repeated with the user inputting additional times and locations. At this point the device IDs may be output to a user through a graphical user interface.

As discussed above, although not necessary for practicing the invention, the first time and the first location may comprise a time and location of a first crime and the second time and the second location may comprise a time and location of a second crime During operation, processor 401 can "rank order" devices that represent the best correlation of devices with access points at the given time. For example, those devices that were located at (associated with) an access point at the exact given time may receive a higher rank than those devices that were associated with an access point, for example, 15 minutes prior to the given time.

Although not discussed in detail, it is assumed that the network operator of the access point may be contacted to obtain the owners/users associated with suspect devices. In addition to contacting the network operator, an internal database may be kept and accessed for this mapping. Additional information may also be obtained. This information includes, but is not limited (1) name, (2) address, (3) physical description, (4) vehicles registered to suspect, (5) description of vehicles registered to suspect, (6) suspect picture, (7) suspect vehicle picture, (8) known accomplices to suspect, (9) suspect mobile devices, (10) suspect social media identifiers (email, twitter ID, etc.), (11) suspect criminal record, (12) suspect voice sample.

The above information may be utilized in several ways that may help law enforcement. For example, once the suspect device(s) has been determined, database 405 may be accessed to determine other access points that the suspect device associated with over time. From this information a route may be derived. If this can be done quickly enough after an event, the route can be used to activate cameras searching for vehicles related to owner of device along predicted path.

Figure 6:
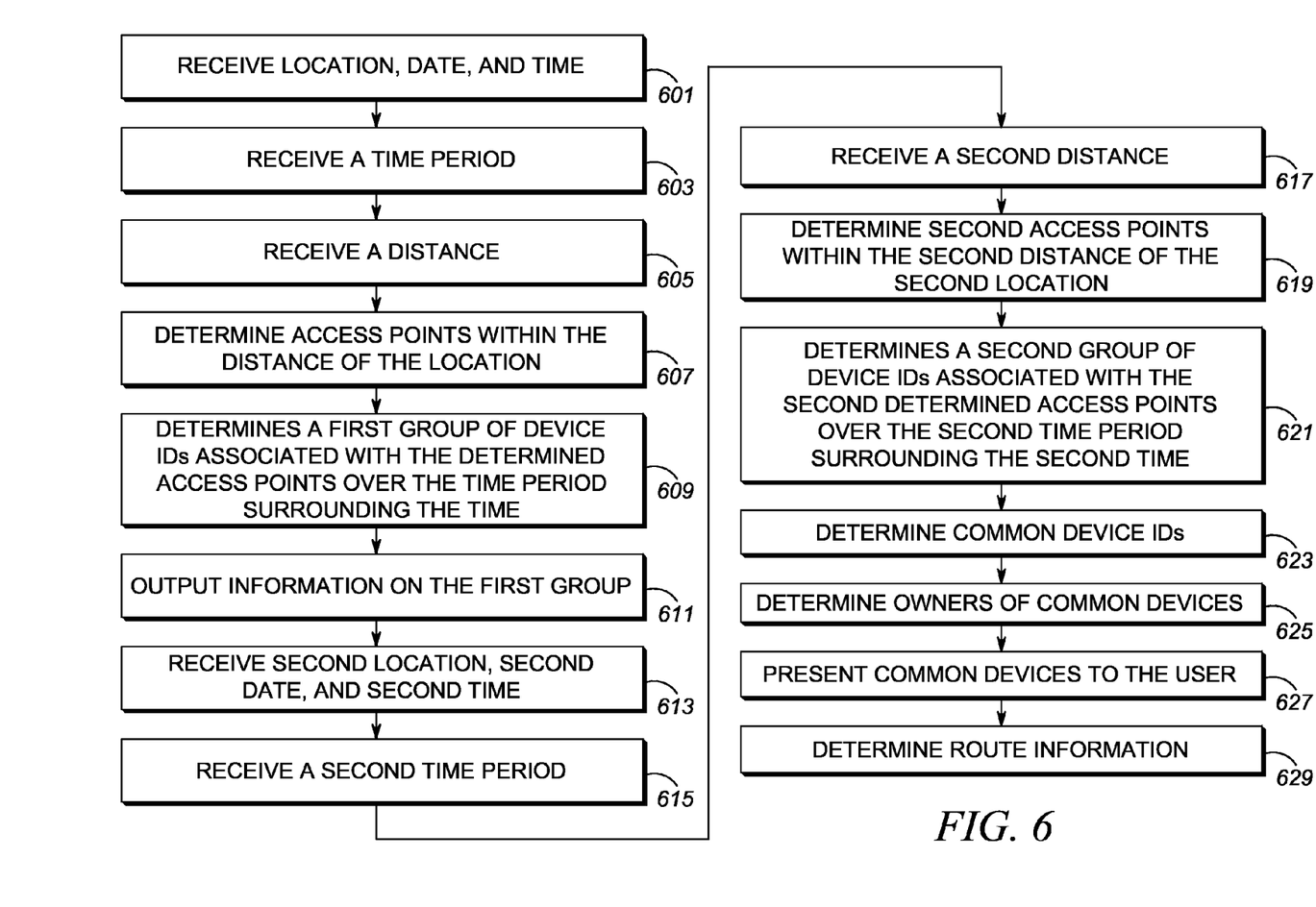
FIG. 6 is a flow chart showing operation of the server of FIG. 4 in more detail.

FIG. 6 is a flow chart showing operation of the server of FIG. 4 in more detail. It should be noted that any step in FIG. 6 is optional. For example, although FIG. 6 will be shown having the steps of, performing route determination, or obtaining owner information for the suspect devices, these steps may be omitted without varying from the scope of the present invention.

The logic flow begins at step 601 where processor 401 receives a location, date and time. At step 603 processor 401 receives a time period. At step 605 processor 401 receives a distance. It should be noted that in this particular embodiment the location, date, time, time period, and distance may all be input by a user via GUI 408.

At step 607 processor 401 then accesses database 407 to determine access points within the distance of the location. At step 609 database 405 is accessed and processor 401 determines a first group of device IDs associated with the determined access points over the time period surrounding the time. This information may be output at step 611.

Processor 401 then receives a second location, second date, and second time (step 613), second time period (step 615), and a second distance (step 617). At step 619 processor 401 then accesses database 407 to determine second access points within the second distance of the second location. At step 621 database 405 is accessed and processor 401 determines a second group of device IDs associated with the determined second access points over the second time period surrounding the second time. The logic flow continues to step 623 where device IDs common to the first group of device IDs and the second group of device IDs are determined and presented to the user (step 625) as a list of suspect devices.

As discussed above, network operators may be contacted to determine owners/users of devices associated with the common device IDs (step 627). Additionally, database 405 may be accessed and searched for a suspect device ID to determine those access points the suspect device associated with in order to determine route information (step 629). In other words, route information for devices associated with the common device IDs may be determined.

In the foregoing specification, specific embodiments have been described. However, one of ordinary skill in the art appreciates that various modifications and changes can be made without departing from the scope of the invention as set forth in the claims below. For example, the above description was provided to enable the determination of individuals through the detection of their device IDs. The device IDs were provided by network infrastructure. However, in alternate embodiments of the present invention these device IDs may be provided to a central server via any method. For example, a child registration database may associate a particular device with a child. These devices may communicate directly with a central server. Alternatively, in an LTE system using "ProSe". one wireless device can discover other wireless devices in range. Wireless nodes capturing IDs in range can then relay this information to a server. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for determining a potential suspect, the method comprising the steps of:
   receiving a first time and a first location;
   determining a first access point near the first location;
   determining a first group of devices associated with the first access point at the first time;
   receiving a second time and a second location;
   determining a second access point near the second location;
   determining a second group of devices registered with the second access point at the second time; and
   determining potential suspect(s) by determining a subset of devices common to the first group of devices and the second group of devices.

2. The method of claim 1 further comprising the steps of:
   determining users associated with the subset of devices.

3. The method of claim 1 wherein the first time and the first location comprises a time and location of a first crime and wherein the second time and the second location comprise a time and location of a second crime.

4. The method of claim 1 further comprising the step of:
   presenting the subset of devices to a user through a graphical user interface.

5. The method of claim 1 further comprising the step of:
   determining route information for the subset of devices.

6. The method of claim 1 further comprising the step of:
   rank ordering the potential suspects.

7. A method comprising the steps of:
   receiving a first location, a first time and a first date;
   receiving a first time period;
   receiving a first distance;
   determining first access points within the distance of the location;
   determining a first group of device IDs associated with the determined first access points over the time period surrounding the time;
   receiving a second location, a second time and a second date;
   receiving a second time period;
   receiving a second distance;
   determining second access points within the distance of the location;
   determining a second group of device IDs associated with the determined second access points over the time period surrounding the time;
   determining device IDs that are common among the first and the second group of device IDs; and
   presenting the common device IDs to a user.

8. The method of claim 7 further comprising the steps of:
   determining users of devices associated with the device IDs that are common.

9. The method of claim 5 further comprising the step of:
   determining route information for devices associated with the common device IDs.

10. The method of claim 7 wherein
    the first location, the first time and the first date comprise a location, time, and date of a first crime; and
    the second location, the second time and the second date comprise a location, time, and date of a second crime.

11. The method of claim 7 further comprising the step of:
    rank ordering the device IDs that are common among the first and the second group of device IDs.

12. An apparatus comprising:
    a database comprising device identifiers, access point identifiers, and times of association of the device identifiers with the access points associated with the access point identifiers
    a processor receiving a first time and a first location, determining a first access point near the first location, accessing the database, and determining a first group of devices associated with the first access point at the first time;

wherein the processor further receives a second time and a second location, determines a second access point near the second location, determines a second croup of devices registered with the second access point at the second time, and determines a potential suspect(s) by determining a subset of devices common to the first group of devices and the second group of devices.

13. The apparatus of claim 12 wherein the processor determines users associated with the subset of devices.

14. The apparatus of claim 12 wherein the first time and the first location comprises a time and location of a first crime and wherein the second time and the second location comprise a time and location of a second crime.

15. The apparatus of claim 12 wherein the processor presents the subset of devices to a user through a graphical user interface.

16. The apparatus of claim 12 wherein the processor determines route information for the subset of devices.

17. The apparatus of claim 12 wherein the processor rank orders the potential suspects.

\* \* \* \* \*

UNITED STATES PATENT AND TRADEMARK OFFICE
CERTIFICATE OF CORRECTION

| | | |
|---|---|---|
| PATENT NO. | : 8,768,315 B2 | Page 1 of 1 |
| APPLICATION NO. | : 13/603589 | |
| DATED | : July 1, 2014 | |
| INVENTOR(S) | : Trent J. Miller et al. | |

It is certified that error appears in the above-identified patent and that said Letters Patent is hereby corrected as shown below:

IN THE SPECIFICATION:

In Column 1, Line 22, delete "scene," and insert -- scene. --, therefor.

In Column 1, Line 27, delete "where" and insert -- were --, therefor.

In Column 7, Line 14, delete "crime" and insert -- crime. --, therefor.

IN THE CLAIMS:

In Column 11, Line 5, in Claim 12, delete "croup" and insert -- group --, therefor.

Signed and Sealed this
Third Day of May, 2016

Michelle K. Lee
*Director of the United States Patent and Trademark Office*